United States Patent

[11] 3,603,233

| [72] | Inventors | Rudolf Kremp<br>Grunwald near Munich;<br>Alfred Winkler, Munich, both of, Germany |
|---|---|---|
| [21] | Appl. No. | 807,333 |
| [22] | Filed | Mar. 14, 1969 |
| [45] | Patented | Sept. 7, 1971 |
| [73] | Assignee | AGFA Geracat Aktiengesellschaft<br>Leverkusen, Germany |
| [32] | Priority | Mar. 19, 1968 |
| [33] | | Germany |
| [31] | | P 16 22 888.9 |

[54] FILM METERING MECHANISM
19 Claims, 4 Drawing Figs.

[52] U.S. Cl. .................................................. 95/31 FM,
95/31 FL
[51] Int. Cl. ..................................................... G03b 1/16,
G03b 1/62, G03b 17/42
[50] Field of Search ............................................. 95/31, 58,
58 X, 58 R, 59, 31 FM, 31 R

[56] References Cited
UNITED STATES PATENTS
3,148,605   9/1964   Peterson et al. ................   95/31

| 3,347,142 | 10/1967 | Steisslinger | 95/31 |
| 2,076,191 | 4/1937 | Adams | 95/59 |
| 3,416,425 | 12/1968 | Rigolini | 95/91 FM |
| 3,232,196 | 2/1966 | Sapp | 95/31 FM |
| 3,416,424 | 12/1966 | Harvey | 95/31 FM |
| 3,487,758 | 1/1970 | Rigolini et al. | 95/31 FM |
| 3,373,670 | 3/1968 | Lawson | 95/31 FM |

Primary Examiner—Samuel S. Matthews
Assistant Examiner—Russell E. Adams, Jr.
Attorney—Michael S. Striker ABSTRACT: A still camera wherein a slide of synthetic plastic material is movable with the first of its several arms against a line of perforations on roll film between the supply and takeup reels in response to rotation of the film transporting wheel. The wheel moves the slide by way of a second arm until a third arm of the slide engages the wheel and holds it against rotation when the first arm enters a perforation. The slide can be retracted to respectively disengage its first and third arms from the film and from the wheel in response to actuation of the shutter release. This release is moveable back and forth and actuates a rockable disk-shaped shutter by way of a snap-over spring.

PATENTED SEP 7 1971 3,603,233
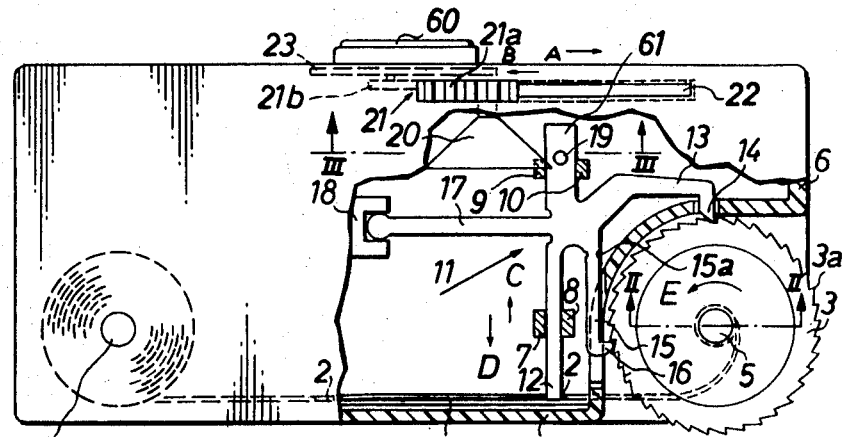
Fig. 1
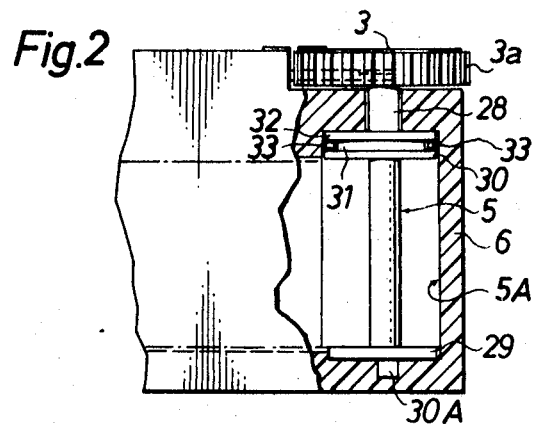
Fig. 2
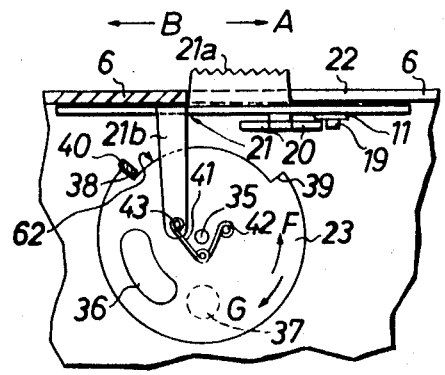
Fig. 4
Fig. 3
INVENTOR.
RUDOLF KREMP
ALFRED WINKLER
BY Michael S. Stricker

3,603,233

FILM METERING MECHANISM

BACKGROUND OF THE INVENTION

The present invention relates to photographic apparatus in general, and more particularly to improvements in still cameras. Still more particularly, the invention relates to improvements in cameras which are provided with means for determining the length of that portion of photographic roll film which can be transported between successive exposures.

It is already known to provide a photographic apparatus with a blocking device which tracks the film and can stop movement of the film transporting mechanism when the film is advanced by the length of a frame. As a rule, such blocking device comprises a tracking member which bears against the film and penetrates into one of a line of perforations in the film to thereby cause a blocking member to engage and arrest a movable portion of the film transporting mechanism. The tracking member is normally entrained by film after it enters a perforation and thereby moves the blocking member into engagement with the movable part of the film transporting mechanism. For example, the blocking member may comprise a pawl which is moved into engagement with a ratchet wheel on the film transporting mechanism when the tracking member is caused by film to cover a predetermined distance subsequent to penetration into a perforation.

A drawback of just described conventional blocking devices is that they comprise a substantial number of parts including springs, levers, links and the like which must be machined with at least some degree of precision and must be assembled, adjusted and serviced by experienced workmen. Furthermore, the tracking member must be biased against the film with considerable force so that it is likely to deflect the film from an optimum position with reference to the objective.

SUMMARY OF THE INVENTION

An object of our invention is to provide a photographic apparatus wherein the operation of the film transporting mechanism is controlled by a compact, inexpensive and rugged device which can be installed in a time-saving operation.

Another object of the invention is to provide a still camera wherein the tracking of film, blocking of the film transporting mechanism and release of the film transporting mechanism can be effected by a single member which occupies less room than the parts which perform similar functions in presently known cameras.

A further object of the invention is to provide a simple, preferably expendable, camera which embodies the just outlined member.

An ancillary object of the invention is to provide a novel mounting for the takeup reel in a still camera of the above outlined character.

Another object of the invention is to provide the camera with a novel shutter and with a novel shutter release.

The improved camera comprises a housing, a supply of roll film provided in the housing and having a line of perforations disposed at intervals corresponding to the length of a film frame, film transporting means preferably comprising a wheel rotatable by hand with reference to the housing in a predetermined direction to draw the film from the supply along a predetermined path, shutter means preferably including a disk which is rockable back and forth about a fixed axis to admit scene light to an unexposed film frame while moving from a first toward a second end position or vice versa, release means operative to actuate the shutter means, and novel control means preferably comprising a slide consisting of synthetic plastic material and mounted in the housing for movement between first and second positions. The control means includes a first portion which is arranged to track the film along the line of perforations and to extend into a perforation in the first position of the control means, a second portion arranged to hold the film transporting means against rotation in the predetermined direction in the first position of the control means, and a third portion arranged to respectively disengage the first and second portions from the film and from the film transporting means in response to operation of the release means and in response to resulting movement of control means to second position. The film transporting means preferably comprises or carries means (for example, a serrated portion of the aforementioned wheel or a discrete ratchet wheel) for moving the control means toward the first position in response to rotation of transporting means in the predetermined direction subsequent to operation of release means.

The novel features which are considered as characteristic of the invention are set forth in particular in the appended claims. The improved photographic apparatus itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 1 is a plan view of a photographic apparatus which embodies the invention, a portion of the housing being shown in section;

FIG. 2 is a partly elevational and partly sectional view of the apparatus, the section being taken along the line II—II of FIG. 1;

FIG. 3 is a fragmentary vertical sectional view as seen in the direction of arrows from the line III—III of FIG. 1; and FIG. 4 is a fragmentary elevational view of a modified film transporting mechanism.

DESCRIPTION OF THE PREFERRED EMBODIMENTS

FIG. 1 shows a simple still camera for use with a specially prepared perforated paper backed roll film 1. The perforations are shown at 2. The camera comprises a film transporting mechanism including a wheel 3 which can draw the film 1 from a supply of film on a supply reel 4 to convolute such film on the core of a takeup reel 5. The channel in which the film 1 travels between the reels 4 and 5 along a predetermined path is not shown in the drawing. In the illustrated embodiment, the wheel 3 of the film transporting mechanism is rigidly connected with the takeup reel 5 and a portion of such wheel extends beyond the camera housing 6 so that it can be readily engaged and rotated by hand. The housing 6 includes fixed guides 7, 8 and 9, 10 for a control member here shown as a slide 11 which is reciprocable with reference to the housing in a horizontal plane parallel to the axis of the objective 60 and normal to the path of film 1 between the reels 4 and 5. The slide 11 preferably consists of synthetic plastic material and comprises an elongated portion or arm 12 which is reciprocable between the guides 7, 8 and serves as a means for tracking the film 1 in order to detect successive perforations 2 as well as a means for permitting stoppage of the wheel 3 when the film is transported by the length of a frame. A second elongated portion or arm 13 of the slide 11 is provided with a blocking tooth 14 which can cooperate with one of an annulus of serrations or teeth 3a on the wheel 3 to hold such wheel against rotation in the direction indicated by arrow E. The teeth 3a further serve as a means for facilitating manual rotation of the wheel 3.

A third portion or arm 15 of the slide 11 is substantially parallel to the arm 12 and has a tooth 16 which can engage one of the teeth 3a on the wheel 3 during certain stages of manipulation of the camera. The root portion of the arm 15 is notched, as at 15a, so as to enhance its elasticity. An elastic fourth portion or arm 17 of the slide 11 extends into a stationary socket 18 which is installed in the housing 6. A fifth portion or arm 61 of the slide 11 is reciprocable between the guides 9, 10 and carries a follower post 19. This follower post cooperates with a frustoconical motion transmitting member 20 which is secured to a shutter release member or trigger 21. The latter is reciprocable in an elongated window or slot 22 provided in the top wall of the housing 6. The directions in which the trigger 21 is movable by hand are indicated by arrows A and B. The handgrip portion 21a of the trigger 21 is accessible at the exposed side of the top wall of the housing 6. The shutter actuating portion of the trigger 21 is shown at 21b.

In FIG. 1, the camera is ready to make an exposure. The tip of the arm 12 extends into the adjoining perforation 2 of the film 1 and the tooth 14 of the arm 13 engages the adjoining tooth 3a of the wheel 3. Thus, the transport of film 1 is prevented not only by the arm 12 but also by the tooth 14 so that the operator cannot accidentally advance the film prior to exposing to scene light that film frame which is located behind the objective 60. To make an exposure, the operator pushes or pulls the trigger 21 in the direction indicated by arrow A (see also FIG. 3) in order to change the angular position of a rockable flat disk-shaped shutter 23. At the same time, the motion transmitting member 20 on the trigger 21 engages the follower post 19 on the arm 61 and pulls the slide 11 in the direction indicated by arrow C so as to withdraw the arm 12 from the adjoining perforation 2. The slide 11 also causes its arm 13 to move the tooth 14 away from the teeth 3a of the film transporting wheel 3. The tooth 16 of the elastic arm 15 moves over the teeth 3a of the wheel 3. When the slide 11 terminates its movement in the direction indicated by arrow C, the tooth 16 of the elastic arm 15 is moved upwardly beyond the center of the wheel 3 and can engage one of the teeth 3a. The wheel 3 is now free to be rotated by hand in the direction indicated by arrow E and to thereby transport the film 1 from the supply reel 4 toward the takeup reel 5. Such transport of film is completed prior to making of the next exposure. While the wheel 3 rotates in the direction indicated by arrow E, one of its teeth 3a pushes the tooth 16 on the elastic arm 15 in the direction indicated by arrow D. Such movement of the arm 15 is shared by the entire slide 11 until the tooth 16 moves away from the path of movement of the teeth 3a. The arm 17 tends to bias the slide 11 in the direction indicated by arrow D so that the tip of the arm 12 abuts against the adjacent side of the film 1 which is transported by the wheel 3. The tip of the arm 12 thereupon enters the next-following perforation 2 in the film 1; such movement of the arm 12 takes place under the bias of the elastic arm 17. When the arm 12 enters the perforation 2, the tooth 14 on the arm 13 engages the nearest tooth 3a and thus prevents further rotation of the wheel 3 in the direction indicated by arrow E. This completes the transport of film 1 by the length of a frame. It will be seen that the distance between successive perforations 2 corresponds to the length of a film frame. During the following exposure, the operator moves the trigger 21 in the direction indicated by arrow B. The motion transmitting member 20 then again pulls the slide 11 in the direction indicated by arrow C so that the aforedescribed procedure is repeated and the wheel 3 is again freed to transport the film 1 by the length of a frame.

Referring to FIG. 2, there is shown that the film transporting wheel 3 is connected to the takeup reel 5 by way of a cylindrical shaft 28. The lower end portion of the reel 5 (as viewed in FIG. 2) carries a flange 29 and is provided with an axially extending trunnion 30A. The latter is rotatably mounted in the bottom wall of the housing 6. The upper end portion of the takeup reel 5 is provided with a second flange 30 connected with a third flange 32 by means of a smaller-diameter connector 31. The parts 30–32 define an annular groove which surrounds the connector 31 and receives a ring-shaped rib 33 of the housing 6. It will be seen that the parts 30–33 define a labyrinth passage which prevents penetration of light into the chamber 5A for the takeup reel 5. Furthermore, the just described parts insure proper mounting of the takeup reel in the housing 6. The parts 30–32 can be said to constitute a single flange having a circumferential groove for the rib 33.

The arm 15 of the slide 11 is sufficiently elastic to permit its tooth 16 to ride over the teeth 3a of the wheel 3 when the motion transmitting member 20 causes the follower post 19 to move the slide in the direction indicated by arrow C. During such movement of the slide 11, the elastic arm 17 stores energy and is ready to propel the tip of the arm 12 into the next-following perforation 2 after the wheel 3 is rotated in the direction indicated by arrow E in order to move the slide 11 in the direction indicated by arrow D so that the tip of the arm 12 begins to bear against the film 1 along the line of perforations 2. The frictional or positive engagement between the arm 15 and the wheel 3 in retracted position of the slide 11 (i.e., after the slide completes its movement in the direction indicated by arrow C) is strong enough to oppose the bias of the arm 17 and to temporarily retain the slide in such retracted position until the wheel 3 is rotated by hand to transport the film from the supply reel 4 toward the takeup reel 5. Once the wheel 3 moves the slide 11 from its retracted position but before the slide reaches its extended position shown in FIG. 1, the arm 17 takes over and biases the tip of the arm 12 against the film and finally causes such tip to enter the next-following perforation 2 to thereby move the tooth 14 into engagement with one of the teeth 3a.

The housing 6 accommodates a suitable friction generating or blocking device which prevents the tooth 16 from rotating the wheel 3 in the direction counter to that indicated by arrow E when the slide 11 is moved in the direction indicated by arrow C.

The details of the shutter assembly are shown in FIG. 3. The aforementioned disk-shaped rotary shutter 23 is rotatable on a shaft 35 which is fixedly mounted in the housing 6. The shutter 23 has a light-admitting opening 36 which is movable with reference to a fixed light-admitting opening 37 provided in the housing 6. If the camera embodies a diaphragm, the opening 37 is of variable size and is defined by the blade or blades of such diaphragm. The marginal portion of the shutter 23 is formed with an elongated arcuate cutout or notch 62 extending between two radially extending stops or shoulders 38, 39. Each of these shoulders can be moved against an abutment 40 which is provided in the housing 6. A snap-over spring 41 has two legs one of which is attached to a retainer pin 42 on the shutter 23 and the other of which is connected to a similar retainer pin 43 on the actuating portion 21b of the trigger 21.

When the handgrip portion 21a is engaged by a finger to move the trigger 21 in the direction indicated by arrow A (FIG. 3), the actuating portion 21b causes the spring 41 to store energy up to a certain point. The spring 41 then snaps over and propels the shutter 23 in the direction indicated by arrow F. The shutter 23 comes to a halt when the shoulder 39 reaches the fixed abutment 40. During such rotary movement of the shutter 23, the opening 36 travels past the opening 37 and the two openings admit scene light to that frame of the film 1 which is located behind the objective 60. In order to make the next-following exposure (subsequent to transport of the film by the length of a frame), the operator moves the handgrip portion 21a in the direction indicated by arrow B. The spring 41 again stores energy up to a certain point and thereupon snaps over in opposite direction to propel the shoulder 38 of the shutter 23 against the fixed abutment 40. The direction in which the shutter 23 rotates in order to move the shoulder 38 against the abutment 40 is indicated by the arrow G.

The camera of our invention can be constructed as an inexpensive expendable product which is loaded with film by the manufacturer and is discarded by the user upon completed exposure of the last frame and upon removal of film from its housing. The housing is then breakable and is destroyed in order to afford access to the film. Such breaking can be carried out by the photographer or at the developing plant if the entire camera with exposed film therein is sent to such plant. At the plant, the film can be removed by breaking open the rear wall of the housing 6.

FIG. 4 illustrates a portion of a modified camera wherein the film transporting wheel 103 is rigidly connected with a ratchet wheel 103a which constitutes a substitute for the serrations or teeth 3a of the wheel 3 and can be engaged by teeth 14 and 16 of the arms 13, 15 in the same way as described in connection with FIGS. 1 to 3.

Without further analysis, the foregoing will so fully reveal the gist of the present invention that others can, by applying current knowledge, readily adapt it for various applications without omitting features which fairly constitute essential characteristics of the generic and specific aspects of our contribution to the art.

What is claimed as new and desired to be protected by Letters Patent is set forth in the appended claims.

1. In a camera, a housing; a supply of roll film provided in said housing and having a line of perforations; film transporting means rotatable with reference to said housing in a predetermined direction to draw the film from said supply along a predetermined path; shutter means; release means operative to actuate said shutter means; and control means movably mounted in said housing and including a first portion arranged to track the film along said line and to enter a perforation in a first position of said control means, a second portion arranged to hold said transporting means against rotation in said direction in said first position of said control means, and a third portion arranged to respectively disengage said first and second portions from the film and from said transporting means in response to operation of said release means and in response to resulting movement of said control means to a second position, said first portion being integral with at least one of said second and third portions of said control means and said transporting means comprising means for moving said control means toward said first position in response to rotation of said transporting means in said direction subsequent to operation of said release means.

2. A structure as defined in claim 1, wherein said control means is reciprocable between said first and second positions in a plane which is substantially normal to the plane of the film in said path.

3. A structure as defined in claim 1, wherein the first portion of said control means comprises an arm and wherein said control means further comprises an elastic fourth portion arranged to bias said arm in a direction to move the latter into a perforation during withdrawal of film from said supply in response to rotation of said transporting means whereby the second portion of said control means engages and holds said transporting means against further rotation in said predetermined direction.

4. A structure as defined in claim 1, wherein the third portion of said control means comprises follower means and said release means comprises motion transmitting means arranged to move the control means to second position by way of said follower means in response to operation of said release means.

5. A structure as defined in claim 4, wherein said release means is movable back and forth between two end positions and wherein said shutter means is arranged to admit scene light to an unexposed film frame in response to each movement of said release means between said end positions thereof.

6. A structure as defined in claim 5, wherein said motion transmitting means is arranged to move the control means to second position by way of said follower means in response to each movement of said release means between said end positions thereof.

7. A structure as defined in claim 1, wherein said control means includes a fourth portion which receives motion from said transporting means to move said control means toward first position in response to rotation of said transporting means in said predetermined direction.

8. A structure as defined in claim 7, wherein said fourth portion is arranged to engage with said transporting means and to thereby hold said control means in second position subsequent to operation of said release means and prior to rotation of said transporting means in said predetermined direction.

9. A structure as defined in claim 8, wherein the fourth portion of said control means is elastic.

10. A structure as defined in claim 7, wherein the means for moving said control means toward first position comprises an annulus of teeth on said transporting means and wherein the fourth portion of said control means comprises a further tooth which engages one tooth of said annulus in the second position of said control means so that said control means is moved toward first position by way of said further tooth in response to rotation of transporting means in said direction.

11. A structure as defined in claim 7, wherein said fourth portion receives motion from said transporting means to move said control means during the initial stage of movement of said control means to first position until said first portion engages with and tracks the film which is being drawn from said supply in response to rotation of said transporting means.

12. A structure as defined in claim 1, wherein said control means consists of synthetic plastic material.

13. A structure as defined in claim 1, further comprising a takeup reel mounted in said housing and connected for rotation with said film transporting means, said film having a leading end connected with said takeup reel and said reel comprising a flange at one end thereof, said flange having a circumferential groove and said housing including a ring-shaped projection extending into said groove to thereby impede penetration of light around said flange and toward the film on said reel.

14. A structure as defined in claim 13, wherein said flange comprises two axially spaced disk-shaped portions and a cylindrical portion of smaller diameter interposed between said disk-shaped portions, said groove surrounding said cylindrical portion.

15. A structure as defined in claim 1, wherein said shutter means comprises a disk rotatable in said housing about a predetermined axis and having a light admitting opening, said release means comprising a shutter actuating portion reciprocable between two end positions and a snap-over spring having a first portion connected with said disk and a second portion connected with said actuating portion, said spring being arranged to rotate said disk in a first direction in response to movement of said actuating portion to one end position and to rotate said disk in a second direction in response to movement of said actuating portion to the other end position.

16. A structure as defined in claim 1, wherein said supply of film is completely encased in and accessible only in response to at least partial breakage of said housing.

17. A structure as defined in claim 1, wherein said film transporting means comprises a manually rotatable wheel and the means for moving the control means toward said first position comprises teeth provided on said wheel, said control means having a projection which engages with one of the teeth on said wheel in the second position of said control means.

18. A structure as defined in claim 3, wherein said fourth portion is integral with the first portion of said control means.

19. A structure as defined in claim 7, wherein said fourth portion is integral with the first portion of said control means.